US012703329B2

(12) United States Patent
Stephens, Jr.

(10) Patent No.: US 12,703,329 B2
(45) Date of Patent: Aug. 11, 2026

(54) REVERSE FLOW DRYER SILENCER APPARATUS

(71) Applicant: International Drying Corporation, Huntley, IL (US)

(72) Inventor: Arthur D. Stephens, Jr., Prairie Grove, IL (US)

(73) Assignee: International Drying Corporation, Huntley, IL (US)

( * ) Notice: Subject to any disclaimer, the term of this patent is extended or adjusted under 35 U.S.C. 154(b) by 568 days.

(21) Appl. No.: 18/228,408

(22) Filed: Jul. 31, 2023

(65) Prior Publication Data

US 2024/0034281 A1 Feb. 1, 2024

Related U.S. Application Data

(60) Provisional application No. 63/393,619, filed on Jul. 29, 2022.

(51) Int. Cl.
*B60S 3/00* (2006.01)

(52) U.S. Cl.
CPC .................................... *B60S 3/002* (2013.01)

(58) Field of Classification Search
CPC ................................ B60S 3/002; F26B 21/50
USPC .................................... 34/666; 454/206, 262
See application file for complete search history.

(56) References Cited

U.S. PATENT DOCUMENTS 1,938,797 A * 12/1933 Bourne .................. F24F 7/013 454/206
5,938,411 A * 8/1999 Seo .................... F04B 39/0055 417/312

FOREIGN PATENT DOCUMENTS

CN 220890590 U * 5/2024

* cited by examiner

*Primary Examiner* — John P McCormack
(74) *Attorney, Agent, or Firm* — Scherrer Patent & Trademark Law P.C.; Stephen T. Scherrer; Monique A. Morneault

(57) ABSTRACT

Car wash dryer apparatuses, namely car wash dryer inlet have a “reverse flow” in that the apparatuses allows a car wash dryer to pull air from the same side of the dryer apparatus to which it expels air. Such a configuration reduces sound levels of the car wash dryer without adding significant static drag. Moreover, such a configuration reduces moisture intake in wet environments, which protects internal components of the dryer apparatus.

1 Claim, 2 Drawing Sheets

A
16
A 40
37
36
38
24
20
26
30
14
52
44
42
34
52
30
32
38
36
40
26
24

REVERSE FLOW DRYER SILENCER APPARATUS

CROSS-REFERENCE TO RELATED APPLICATIONS

The present invention claims priority to U.S. Prov. Pat. App. No. 63/393,619, titled "Reverse Flow Dryer Silencer Apparatus," filed Jul. 29, 2022, which is incorporated herein by reference in its entirety.

TECHNICAL FIELD

The present invention relates to dryer apparatuses, namely car wash dryer apparatuses, more specifically, to inlet assemblies for drawing air into a carwash apparatus. Specifically, the present invention comprises a car wash dryer inlet assembly having a "reverse flow" in that the assembly allows a car wash dryer inlet assembly to pull air from the same side of the assembly to which it expels air. Such a configuration reduces sound levels of the car wash dryer without adding significant static drag. Moreover, such a configuration reduces moisture intake in wet environments, which protects internal components of the dryer apparatus.

BACKGROUND

Car washes typically have high-powered blowers near or at the ends thereof that can blow off excess water and provide drying to the vehicles passing therethrough. Often, these dryers are large fans or turbines that draw air in through an intake and flow air out through nozzles or other like outflow orifices. Moreover, heating elements are commonly used to heat the air blowing therethrough to provide warm or hot air to aid in drying the vehicles.

Common car wash dryers draw air from one side of the unit via turbines that then blow air out through the other side of the unit. Because of the open passage from one side of the unit to the other side of the unit, the sound generated by the dryers can be very loud on both sides of the blower. Therefore, passengers in vehicles passing through the car wash may be exposed to high decibel levels. Likewise, workers working in or around the car wash may also be exposed to high decibel levels, which may damage workers' and vehicle passengers' ears.

Moreover, many typical carwash dryers may be aimed so that vehicles passing therethrough or thereunder may have air blow thereon from the rear position of the vehicle to the front. In such a configuration, air drawn into the dryer units may be from the interior of the carwash, namely the section of the carwash that is spraying and misting water on the vehicle. Because air is drawn into the dryer unit typically from the rear of the unit, the air drawn into the dryer unit may have a high moisture content. Specifically, the dryer units may pull in air and a large amount of moisture, which may damage internal components of the dryer units, such as the interior surfaces as well as moving parts, such as the turbines, the heating elements, and electrical systems of the dryer units. Therefore, typical carwash air dryers often need repairing and replacement due to the damage caused by the drawing in of moisture. Also, dryer units that intake a large amount of moisture will push the moisture-laden air onto the vehicles, decreasing the ability of these units to dry the vehicles.

In addition, many typical car wash drying units are relatively long and take up a large amount of space. Typically, car wash drying apparatuses are lengthy units that draw air in on one side and push air out, through the aforementioned turbines and other like parts, to the nozzles on the opposite sides thereof.

A need, therefore, exists for improved carwash dryer units. Specifically, a need exists for improved carwash dryer units that may decrease sound levels compared to typical carwash dryer units. More specifically, a need exists for improved carwash dryer units that may be safer for vehicle passengers and workers, thereby protecting hearing of the same.

Moreover, a need exists for improved carwash dryer units that decrease moisture levels drawn both into the units and expelled from the units compared to typical carwash dryer units. Specifically, a need exists for improve carwash dryer units that protect internal components by intaking lower amounts of moisture. In addition, a need exists for improved carwash dryer units that minimize moisture expelling from the carwash dryer units, thereby maximizing the drying efficiency of the carwash dryer units.

In addition, a need exists for improved car wash dryer units that are smaller than typical car wash dryer units. Specifically, a need exists for improved car wash dryer units that take up less space within a car wash than typical car wash dryer units.

SUMMARY OF THE INVENTION

The present invention relates to dryer apparatuses, namely car wash dryer apparatuses, more specifically, to inlet assemblies for drawing air into a carwash apparatus. Specifically, the present invention comprises a car wash dryer inlet assembly having a "reverse flow" in that the assembly allows a car wash dryer inlet assembly to pull air from the same side of the assembly to which it expels air. Such a configuration reduces sound levels of the car wash dryer without adding significant static drag. Moreover, such a configuration reduces moisture intake in wet environments, which protects internal components of the dryer apparatus.

To this end, in an embodiment of the present invention, a carwash dryer inlet assembly is provided. The carwash dryer inlet assembly comprises a housing having a first end and a second end, the first end of the housing having an inlet opening configured to draw air into the inlet assembly and an outlet opening on the first end of the housing configured to move air out of the inlet assembly. The carwash dryer inlet assembly further comprises an inlet path, a curved portion transitioning to an outlet path for directing airflow from the inlet opening to the outlet opening. Disposed near a second end of the housing is a conical element for further directing airflow therethrough. The outlet opening is formed from a frustoconical portion. The frustoconical portion comprises a flange that is configured to attach to additional parts of a carwash dryer apparatus.

It is, therefore, an advantage and objective of the present invention to provide improved carwash dryer unit apparatuses.

Specifically, it is an advantage and objective of the present invention to provide improved carwash dryer unit apparatuses that may decrease sound levels compared to traditional carwash dryer units.

More specifically, it is an advantage and objective of the present invention to provide improved carwash dryer units that may be safe for vehicle passengers and workers, thereby protecting hearing of the same.

Moreover, it is an advantage and objective of the present invention to provide improved carwash dryer units that decrease moisture levels drawn both into the units and expelled from the units.

Specifically, it is an advantage and objective of the present invention to provide improved carwash dryer units that protect internal components by intaking lower amounts of moisture that typical carwash units.

In addition, it is an advantage and objective of the present invention to provide improved carwash dryer units that minimize moisture expelling from the carwash dryer units, thereby maximizing the drying efficiency of the carwash dryer units.

Moreover, it is an advantage and objective of the present invention to provide improved car wash dryer units that are smaller than typical car wash dryer units.

Specifically, it is an advantage and objective of the present invention to provide improved car wash dryer units that take up less space within a car wash than typical car wash dryer units.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to dryer apparatuses, namely car wash dryer apparatuses. Specifically, the present invention comprises a car wash dryer inlet apparatus having a "reverse flow" in that the apparatus allows a car wash dryer to pull air from the same side of the dryer to which it expels air. Such a configuration reduces sound levels of the car wash dryer without adding significant static drag. Moreover, such a configuration reduces moisture intake in wet environments, which protects internal components of the dryer apparatus.

Figures 1, 2, 3:
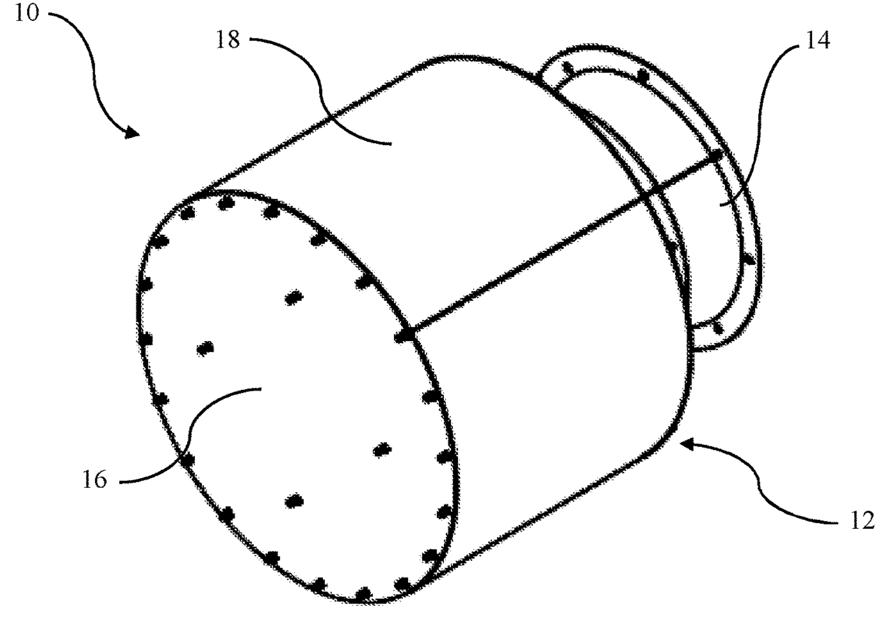
FIG. 1 illustrates a perspective view of a reverse flow dryer apparatus in an embodiment of the present invention.
FIG. 2 illustrates an end view of a reverse flow dryer apparatus in an embodiment of the present invention.
FIG. 3 illustrates a cross-sectional view along line A-A in FIG. 2 in an embodiment of the present invention.

Now referring to the drawings, FIG. 1 illustrates a perspective view of a carwash dryer apparatus reverse flow silencer assembly 10 in an embodiment of the present invention. Although the present disclosure describes the dryer apparatus in the context of a carwash dryer or blower, it should be noted that the reverse flow silence assembly described herein may be utilized with any dryer or blower for any other application that may be apparent to one of ordinary skill in the art. Specifically, the reverse flow silencer assembly 10 is configured to attach to a car wash dryer apparatus, mainly a body (not shown) having a turbine therein for intaking air through the assembly 10 for distribution through nozzles or the like to a vehicle for drying the same.

The assembly 10 may comprise an outer housing 12 that may house an outlet assembly 14. The outer housing 12 may comprise an end plate 16 that may be bolted or otherwise attached to an outer assembly 18 that may form a cylindrical interior in which the outlet assembly 14 may be positioned, as illustrated in FIG. 3, which is a cross-sectional view of the assembly 10 along lines A-A shown in FIG. 2.

Figure 4:
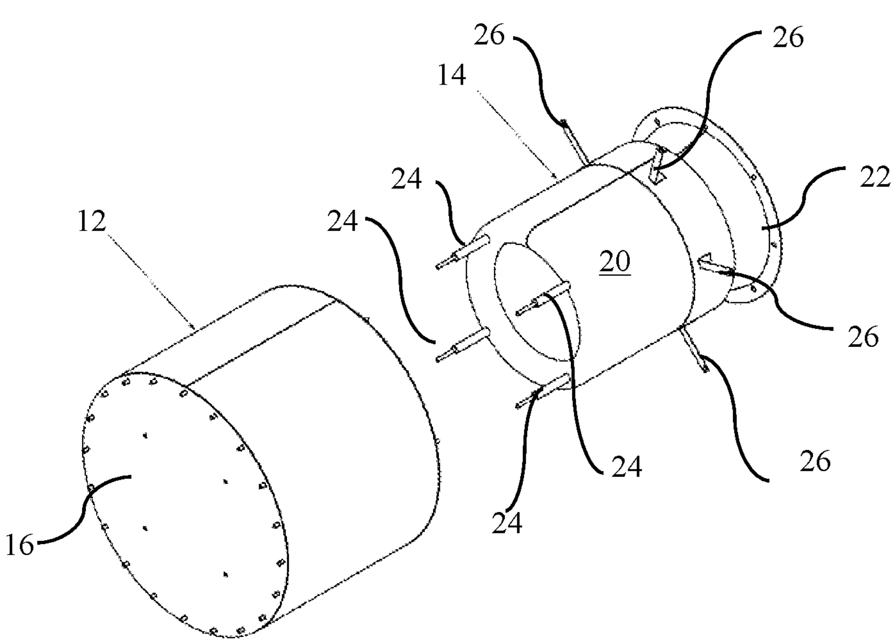
FIG. 4 illustrates an exploded view of a reverse flow dryer apparatus in an embodiment of the present invention.

As illustrated in FIGS. 3 and 4, the outlet assembly 14 may comprise a cylindrical portion 20 and a frustoconical portion 22 that may move air toward additional parts of a carwash dryer apparatus, as mentioned above. The outlet assembly 14 may be held in place using a plurality of mounting rods 24 that may attach an end of the cylindrical portion 20 to the end plate 16 and a plurality of mounting straps 26 that may connect the cylindrical portion 20 to the outer housing 12.

Moreover, as shown in FIG. 3, the outer housing 12, comprising the cylindrical outer assembly 18 and the end plate 16, may hold the outlet assembly 14 in a position within the interior space thereof via the mounting rods 24 and the mounting straps 26 to form an inlet opening 30 on a first end 32 of the assembly 10 between the outer housing 12 and the outlet assembly 14. The inlet opening 30 may start an inlet pathway 36 toward a second end 34 of the assembly 10 between the outer housing 12 and the outlet assembly 14.

At approximately the location of the mounting rods 24, an interior surface 37 of the outer assembly 12 may have a curve 38 and airflow 40 traveling from the inlet opening 30 through the inlet pathway 36 and around the curve 38 to an interior space 42 of the outlet assembly 14. The curve 38 may provide a smooth transition of the airflow 40 from the inlet pathway 36 to the interior space 42, thereby reducing drag and noise created thereby. In addition, a conical element 44 may extend from the end plate 16 toward the interior space 42 of the outlet assembly 14, thereby directing the airflow 40 around the curve 38 and toward the interior space 42 and the frustoconical portion 22 at the first end 32 of the assembly 10.

Thus, airflow 40 pulled into the assembly 10 via turbines, fans, or other like air movers from additional parts of the dryer apparatus (not shown) may be directed through the inlet path 36, around the curve 38, and out the outlet assembly 14 through the interior space 42 of the outlet assembly 14 and through the frustoconical portion 22 of the outlet assembly 14 and through an outlet opening 39 of the outlet assembly.

The interior surface 37 of the outer housing 12 may be formed from an insulation material, such as, in an exemplary embodiment, Knauf™ brand insulation material. Thus, the curve 38 and the conical element 44 may be formed having the insulation material disposed therein. The interior surface 37 may be formed of a skin material, such as metal material or other like material and the insulation material may be disposed between the interior surface 37 and the outer assembly 18 and the end plate 16.

Because the inlet opening 30 is on the same side as the outlet opening 39, sound generated by the turbines that pull air through the assembly 10 may be directed toward the first end 32 of the assembly 10. In addition, because air is pulled through the inlet opening 30 and out the outlet opening 39, the overall length of the assembly 10 may be greatly decreased compared to a typical car wash dryer apparatus. Specifically, the overall length of the assembly 10 may be roughly half of a typical similar car wash dryer apparatus, thereby having less space requirements within a car wash.

Figure 5:
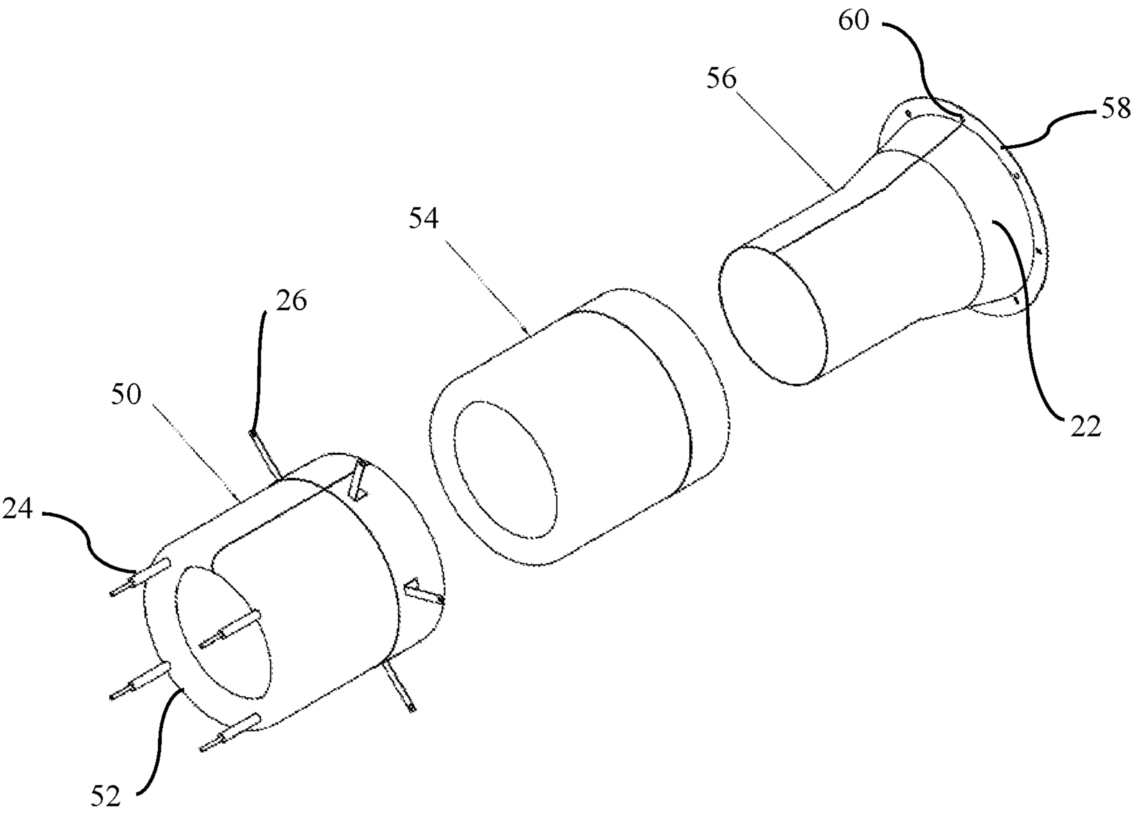
FIG. 5 illustrates an exploded view of a reverse flow dryer apparatus in an embodiment of the present invention.

FIG. 5 illustrates an exploded view of the outlet assembly 14, illustrated the various components thereof. Specifically, the outlet assembly 14 may comprise an outer skin material 50, on which the mounting rods 24 and the mounting straps 26 may be attached, as shown. The outer skin material 50 may have a curved surface 52 on an end thereof that, when constructed together with the outer housing 12, roughly corresponds in location to the curve 38 on the interior surface 37 of the outer housing 12. Thus, the airflow 40 passing through the inlet path 36 may more easily traverse around curve 38 to expel through the outlet path 40, lessening drag of the airflow moving therethrough and sound generated thereby.

Within the skin material 50 may be a corresponding insulation material 54, preferably Knauf™ brand insulation. Disposed within the insulation material 54 may be the frustoconical portion 22, which may include a cylindrical segment 56 extending therefrom, which may form an interior surface of the interior space 42. Thus, the insulation material 54 may be disposed between the skin material 50 and the cylindrical segment 56 and a portion of the frustoconical portion 22.

The insulation material described herein may be used to reduce the sound of airflow passing through from being heard from outside the assembly 10. When used, airflow is moved into the assembly 10 from the first end 32 of the assembly 10, traverses through the inlet pathway 36, around the curve 38, and expels out the assembly 10 through the interior space 42 and through the frustoconical portion 22, also on the first end 32 of the assembly 10. Therefore, airflow is directed into the assembly 10 and expelled from the assembly 10 on the same end (namely, the first end 32) thereof.

The frustoconical portion 22 of the outlet assembly 14 may have a flange 58 extending therefrom so that the assembly 10 may be attached to additional parts of a carwash dryer apparatus, such as the parts the contain the turbines and other like parts. The flange 58 may have apertures 60 therein for attaching bolts, screws, or other like connecting elements thereto to connect the same to additional parts of a carwash dryer apparatus.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A carwash dryer inlet assembly comprising:

a housing having a first end and a second end, the first end of the housing having an inlet opening configured to draw air into the inlet assembly and an outlet opening on the first end of the housing configured to move air out of the inlet assembly;

an inlet path having a curved portion transitioning to an outlet path for directing airflow from the inlet opening to the outlet opening; and a conical element disposed near the second end of the housing configured to direct airflow therethrough to the outlet opening, wherein the outlet opening is formed from a frustoconical portion comprising a flange that is configured to attach to additional parts of a carwash dryer apparatus.

* * * * *